(12) United States Patent
Kadner et al.

(10) Patent No.: US 6,197,073 B1
(45) Date of Patent: Mar. 6, 2001

(54) PROCESS FOR PRODUCING ALUMINUM OXIDE BEADS

(75) Inventors: Martin Kadner, Maintal; Egbert Brandau, Alzenau; Hans Huschka, Hanau, all of (DE)

(73) Assignee: Egbert Brandau, Alzenau (DE)

( * ) Notice: Subject to any disclaimer, the term of this patent is extended or adjusted under 35 U.S.C. 154(b) by 0 days.

(21) Appl. No.: 08/958,865

(22) Filed: Oct. 27, 1997

Related U.S. Application Data

(63) Continuation of application No. 08/039,498, filed as application No. PCT/EP91/02057 on Oct. 30, 1991, now abandoned.

(30) Foreign Application Priority Data

Nov. 5, 1990 (DE) ................................. 40 35 089
Nov. 5, 1990 (DE) ................................. 40 42 594

(51) Int. Cl.$^7$ ............................. B29B 9/10; B01J 35/08; B01J 20/08; C01F 7/02
(52) U.S. Cl. .......................... 23/305 A; 264/9; 264/12; 264/13; 423/626; 423/628; 508/8; 508/415
(58) Field of Search .................... 23/305 A; 508/8, 508/415; 423/626, 628; 264/9, 12, 13

(56) References Cited

U.S. PATENT DOCUMENTS

| | | | | |
|---|---|---|---|---|
| 2,968,833 | * | 1/1961 | De Haven et al. | 264/9 |
| 3,579,721 | * | 5/1971 | Kaltenbach | 264/9 |
| 4,043,507 | * | 8/1977 | Wace | 239/102 |
| 4,179,408 | * | 12/1979 | Sanchez | 423/628 |
| 4,190,622 | * | 2/1980 | Landis | 264/14 |
| 4,198,318 | * | 4/1980 | Stowell et al. | 502/8 |
| 4,309,312 | * | 1/1982 | Takumi | 423/626 |
| 4,347,200 | * | 8/1982 | Bezzi et al. | 264/9 |
| 4,392,987 | * | 7/1983 | Laine et al. | 502/8 |
| 5,500,162 | * | 3/1996 | Theisen et al. | 264/9 |

FOREIGN PATENT DOCUMENTS

| | | | |
|---|---|---|---|
| 1803724 | * | 9/1969 | (DE) . |
| 2942268 | * | 5/1980 | (DE) . |
| 2135598 | * | 5/1972 | (FR) . |
| 2387076 | * | 4/1978 | (FR) . |

* cited by examiner

Primary Examiner—Gary P. Straub
(74) Attorney, Agent, or Firm—Pillsbury Madison & Sutro LLP

(57) ABSTRACT

In order to produce aluminium oxide beads, an acid aluminium oxide sol or an acid aluminium oxide suspension is converted into droplets by a vibrating nozzle plate and pre-solidified after the formation of a bead shape by laterally blowing gaseous ammonia and then coagulated in an ammonia solution.

10 Claims, No Drawings

PROCESS FOR PRODUCING ALUMINUM OXIDE BEADS

This is a continuation of application Ser. No. 08/039,498, filed on Apr. 28, 1993, which was abandoned upon the filing hereof which is a 371 of PCT/EP91/02057 filed Oct. 30, 1991.

BACKGROUND OF THE INVENTION

1. Field of the Invention

Process for Producing Aluminum Oxide Beads The invention relates to a process for producing aluminum oxide beads, in which an acid aluminum oxide sol or an acid aluminum oxide suspension having a viscosity of 10 to 500 mPa.s is produced and converted into droplets, the droplets are coagulated in an aqueous ammonia solution, and the gel beads thereby formed are aged, washed, dried and calcined. Aluminum oxide beads can be used as, for example, adsorbents in chromatography or as catalysts or catalyst carriers.

When used in a fixed bed, the bead shape of the catalyst permits a very even packing of the catalyst inside the reactor. In addition, bead-shaped carriers have a low tendency to formation of unwelcome channels. In a moving catalyst bed (moving bed), the good flow properties of round particles also have an advantageous effect.

2. Description of the Related Art

A process for producing micro-beads in the form of uranium oxide is known from FR-A-2 387 076. The droplets, which are laterally blown with ammonia gas, are formed by a vibrated nozzle plate. The diameter of the micro-beads is approximately 80 μm.

A known process for producing aluminum oxide beads is described in U.S. Pat. No. 2,620,314, whereby a hydrosol is made from aluminum chips, aluminum trichloride and water that is then mixed with an aqueous hexamethylene tetramine solution and dripped into a hot oil bath. The gel beads are aged for at least 10 hours in hot oil, then washed, dried and calcined.

Further known processes based on this principle of solidification of aluminum oxide hydrosols in forming columns filled with hot oil are described in U.S. Pat. Nos. 2,774,743, 3,096,295, 3,600,129, 3,714,071, 3,887,492, 3,919,117, 3,943,070, 3,972,990, 3,979,334, 4,250,058 DE-C 27 42 709, DE-C 29 42 768 and DE-C 29 43 599.

In U.S. Pat. No. 4,116,882, a process is described whereby an aluminum oxide filter cake obtained by hydrolysis from aluminum alkoxides is peptized with the aid of a dilute acid, and the resultant slurry dripped into a forming column in which the top phase comprises naphtha and the bottom phase a 10% ammonia solution. To reduce the surface tension between the hydrocarbon phase and the aqueous phase, a non-ionic, surface-active agent is added to the ammonia solution. The gel beads are aged in aqueous ammonia solution, dried and calcined.

A process is known from DE-A 28 12 875 whereby a slurry is initially formed from a microcrystalline boehmite/pseudo-boehmite intermediate product by addition of an acid.

This slurry is then dripped into a hydrocarbon/ammonia solution forming column, and the gel beads thereby obtained are dried and calcined. The shaped elements have a specific surface area of 90 m$^2$/g to 120 m$^2$/g and a bulk density of 0.42 g/cm$^3$ to 0.51 g/cm$^3$.

DE-C 32 12 249 describes a process for producing bead-shaped aluminum oxide whereby a stable hydrosol is obtained by dispersion of a mixture of boehmite and pseudo-boehmite in an aqueous acid in the presence of urea. This sol is then shaped by dripping it into a hydrocarbon/ammonia solution forming column. Here too, a surface-active agent is added to the ammonia solution. In addition, the possibility is demonstrated of influencing substantial bead properties such as porosity, bulk density and breaking strength by using sol additives in the form of hydrocarbons and suitable emulsifiers.

DE-A 33 46 044 describes a process for carrier production on an aluminum oxide basis, in which a suspension or aqueous dispersion is produced by stirring boehmite into an aqueous acid with the addition of an aluminum oxide obtained from boehmite by tempering. This suspension or dispersion is then mixed with an organic phase and an emulsifying agent, and the emulsion obtained ("oil in water" type) is shaped in the known manner in a two-phase column. The pore volume and bulk density can be adjusted within certain limits by varying the weight proportions of hydrocarbon and calcined aluminum oxide used in the sol.

U.S. Pat. No. 3,558,508 describes a process for producing aluminum oxide beads by pouring an acid dispersion of aluminum oxide hydrate into a forming column and dripping with a mixture of mineral oil and carbon tetrachloride. The oil/CCl$_4$ mix is saturated with gaseous ammonia, thereby achieving solidification of the sol droplets as they sink inside the forming column.

DE-A 32 42 293 describes a process for producing beads having a diameter of 0.01 to 2 mm. Small sol droplets are obtained here by atomizing an acid aluminum oxide sol with an inert gas or inert liquid. The droplets can be coagulated either in a forming column of the "hydrocarbon/aqueous ammonia" type or in hot air (spray drying).

U.S. Pat. No. 4,198,318 describes a process in which aluminum oxide particles with substantially spherical form are produced by dripping hydrosols of low viscosity into an aqueous ammonia solution. The acid hydrosol is dripped into the ammonia phase from a drop height of 0.5 to 2 cm. To facilitate immersion of the droplets into the coagulation medium, a non-ionic surface-active agent is admixed to the ammonia solution. In this process, in which the use of hydrocarbons as the shaping media is dispensed with, it is obviously of especial importance that the very short drop height is very precisely optimized and maintained, since the form of the gel beads can only be adjusted using this drop height.

High throughputs are not however obtained in this process variant, because a maximum of 5 drops per second can be attained per nozzle. In addition, there is always the risk with so short a drop height that the nozzles can be clogged by rising ammonia vapors.

DE-C 24 59 445 describes a process for producing mutually identical, bead-shaped fuel particles by conversion of a liquid jet of solutions containing uranium or thorium and flowing out of one or more nozzles and made to vibrate, in a quantity of 3000 droplets per minute, whereby the droplets first pass through an ammonia-free drop distance before immersion in the ammonia solution, said distance being dimensioned such that the droplets have just taken on their bead shape and then immediately pass through a drop distance filled by ammonia gas in order to stabilize this bead shape, with the ammonia gas being introduced into this drop distance such that in addition to an ammonia gas flow opposite to the droplet fall direction a horizontal transverse flow component of the ammonia gas is ensured through the droplet intervals, with this drop distance being dimensioned such that the bead-shaped droplets harden sufficiently before immersion into the ammonia solution.

DETAILED DESCRIPTION OF THE INVENTION

The problem underlying the invention is to produce aluminum oxide elements with optimum bead shape and narrow grain spectrum, in conjunction with suitable porosity and high breaking strength plus low abrasion loss.

The problem is solved in accordance with the invention either in that the aluminum oxide hydrosol droplets are generated by a nozzle plate vibrated with a frequency of 10 Hz to 20000 Hz and having several nozzles, in that the droplets of each nozzle are pre-solidified by separate lateral blowing with ammonia gas in order to pre-solidify such droplets, and in that the pre-solidified droplets are then collected in an ammonia solution, or in that the aluminum oxide hydrosol droplets are generated by a nozzle plate vibrated with a frequency of 10 Hz to 20000 Hz and having several nozzles disposed on a ring and in that the droplets coming from the ring interior and from the ring exterior of the nozzle ring are pre-solidified by blowing with ammonia gas, and in that the pre-solidified droplets are then collected in an ammonia solution.

Aluminum oxide sols or aluminum oxide suspensions suitable for the process in accordance with the invention can be produced according to the prior art from, for example, alumina dehydrates such as boehmite, ultra-fine pseudo-boehmite, hydrargillite or bayerite, etc., by dispersal in aqueous acid, e.g. nitric acid. It is further possible to obtain in the known manner, from metallic aluminum by the action of diluted acid such as HCl, aluminum sols or suspensions that can then be treated using the process in accordance with the invention.

Maintaining a narrow viscosity range is advantageous for the process in accordance with the invention. If the sol or suspension has too high a viscosity, the disintegration of the liquid jet into droplets is hindered, leading to a wide grain spectrum.

By contrast, sols or suspensions with too low a viscosity cannot be processed into several millimeter-sized aluminum oxide beads, as lentil-shaped or kidney-shaped forms are then obtained. The setting of the necessary viscosity range in the range from 10 to 500 mPa.s, preferably 50 to 200 mPa.s at room temperature, is achieved for example via the aluminum oxide content, the acid concentration, the temperature or the aging conditions.

A mass-produced item such as aluminum oxide beads can only be produced economically with a high throughput. For this reason the method of vibration droplet formation known from DE-C 24 59 445 is applied. To further increase throughput, a vibrating nozzle plate with several identical nozzles was used instead of the known unicomponent nozzle. This nozzle plate is, like the known unicomponent nozzle, connected to the supply vessel for the sol/suspension via a hose or pipe with flow meter. When identical flow conditions as ascertained previously for the unicomponent nozzle are set at each nozzle of this nozzle plate, it was surprisingly found that the same uniform disintegration of the liquid jets into uniform droplets was obtained at each nozzle, always providing however that the viscosity of the sol/suspension was within the stated limits.

A further condition to be met was that the flow resistance of each nozzle in the nozzle plate was of the same magnitude. This entails identical nozzle shape, hole length and nozzle diameter.

It was found that by precise manufacture, nozzle plates with 10 or more nozzles can be used provided the mechanical coupling of the electromagnetic vibration system has been tuned to the greater mass. With low-viscosity liquids, it was even possible to use a 101-nozzle plate with success. The vibration frequency of the nozzle plate in accordance with the invention is between 10 and 20000 Hz, preferably 50 to 12000 Hz.

With the annular nozzle array provided in accordance with the invention, the droplets are blown from the ring interior and the ring exterior. Blowing can be with $NH_3$ at least from the ring interior.

By using nozzle plates, the process affords the possibility of producing aluminum oxide beads with high throughputs without detriment to the reproducibility of grain size and bead shape.

The process in accordance with the invention has the advantage that in contrast to the prior art, the use of organic liquids as the shaping agents or coagulation media can be dispensed with fully. This avoids contamination of waste air and waste water with organic substances and the need for expensive treatment of the latter.

Collection of sol or suspension droplets of aluminum oxide hydrate in aqueous ammonia solution, which can have a concentration of 5 to 10% by weight, leads, in the case of a longer drop distance as used with vibration-type droplet formation, not to bead-shaped gel particles, but to flakes and the like.

These droplets can nevertheless be converted to gel beads in accordance with the invention, provided they have been pre-solidified with ammonia gas prior to immersion in the aqueous solution.

The electrical charge reversal of the sol then occurring at the droplet surface is sufficient to stabilize the bead shape such that the particles can be collected in the precipitation bath as gel beads. The precondition here is that the droplets are not too large, otherwise they will burst.

The use of nozzle plates with 10 and more nozzles makes the contact of the falling droplets with ammonia gas more difficult, because much air is mixed from above into the ammonia gas, with the result that some droplets cannot solidify at all. In accordance with the invention, the droplets from every nozzle of the nozzle plate are selectively blown from the side with ammonia gas after a certain drop distance. This achieves a precise, constant and point-shapeed solidification of the droplets, and prevents uncontrolled turbulences occurring in the area of the still liquid droplets that could lead to a wide grain spectrum due to droplet fusion.

Lateral blowing of the sol/suspension droplets with ammonia gas therefore achieves a rapid pre-solidification, as a result of which the drop distances in the gas phase can be reduced. Surprisingly, this also permits the production of beads with diameters in excess of 1 mm.

Further improvement of the bead shape of the gel particles can be achieved by generation of a foam layer up to several centimeters thick (preferably 0.5–5 cm) on the ammonia solution by adding a tenside and gently blowing in air or ammonia-containing air. A separate tenside solution for making foam can also be used.

When a glass frit is used for making very fine gas bubbles, a continuously regenerating foam layer of between 5 and 50 mm depth can be built up, which surprisingly leads to a further shape improvement of the gel beads, in particular from large sol droplets. This allows production of gel particles of 3.5 mm diameter and more. This generation in accordance with the invention of a foam layer by the addition of a tenside to the ammonia solution and blowing in air while using a fine-pored frit allows the grain size of the $Al_2O_3$ beads producible to be increased to up to 5 mm diameter. The tenside dodecyl sulphate in the form of a sodium salt dissolved in ammonia, for example, with 0.2% by volume has proved particularly effective.

The gel beads generated can be aged in an ammonia solution, for example. The particles are then removed and if necessary washed with water or dilute ammonia solution, for example.

The particles are dried at temperatures between 20° C. and 300° C. in times ranging from 1 to 24 hours, if necessary in several stages and with preset water vapor pressures. Shrinkage generally occurs, in which the beads can lose up to 70% of their volume.

Subsequent calcination or activation is implemented by tempering at 500° C. to 800° C., preferably over a period of 2 to 12 hours.

With the process in accordance with the invention, it is possible to produce aluminum oxide beads with diameters of 50 $\mu$m to 5 mm. By a possible prior calculation of the bead size, lengthy optimization tests can be dispensed with and a very low proportion of oversize and undersize grains generated during production.

A substantial advantage of the process in accordance with the invention is its excellent bead shape. This has an advantageous effect on the flow behavior and also on the packaging properties. The optimum sphericity of the beads, characterized by the absence of deformities, indentations, bulges and protuberances ensures an improved breaking strength and more favorable abrasion characteristics, for example when used in a moving bed.

Further details, advantages and features of the invention are given not only in the claims and in the features they describe—singly and/or in combination—but also in the following description of embodiments.

EXAMPLE 1

5.0 kg of aluminum oxide hydrosol are made by intensively mixing 1250 g of aluminum oxide hydrate (pseudo-boehmite, 75% $Al_2O_3$, specific surface area to BET 258 $m^2/g$) at room temperature into a solution of 69.0 g nitric acid (65%) and 3681 g of water, and then continuing to mix them for about 15 minutes.

The sol, which has a $Al_2O_3$ concentration of 221 g/l, a density of 1.18 kg/l and a viscosity of 90 mPa.s at room temperature, is then transferred to a closed supply vessel where it is kept in motion by slow stirring. Using 0.3 bars of compressed air, the sol is conveyed via a hose and a flow meter to a vibrating nozzle plate with ten 350 $\mu$m diameter nozzles arranged in a ring, from which nozzles thin jets of sol flow at constant speed and form uniform drops as a result of the periodic vibration applied. The shape of the 10 nozzles was identical and corresponds to known unicomponent nozzles. The divergence in the diameter is less than ±10 $\mu$m in all 10 nozzles.

After a drop distance of 5 cm length through air, the droplets are laterally blown by ammonia gas in a precipitation vessel and then collected in ammonia solution. The liquid droplets are transformed here into $Al_2O_3$ gel beads.

The droplets are blown at each nozzle separately from one narrow pipe each having a diameter of 10 mm and spaced about 1 cm apart.

The drop distance in ammonia gas is 5 cm long. The flow rate of the sol is 140 ml/min and the periodic vibration is 1200 Hz. 1200 droplets per second with a diameter of 0.7 mm are generated at each nozzle. This corresponds to a throughput of 1.8 kg of $Al_2O_3/h$.

The gel beads are aged for about 1 h in aqueous ammonia solution and then dried for 2 h at 150° C. For activation, the dried particles are tempered for 4 hours at 650° C.

By way of comparison, a conventional unicomponent nozzle of the same shape and diameter as the nozzles of the nozzle plate is used instead of the 10-nozzle plate. With otherwise identical process parameters, droplets or gel beads are produced of the same size as when a 10-nozzle plate is used with a tenth of the flow rate, i.e. 14 ml/min.

After further processing by drying and activation, the final diameters of the aluminum oxide beads are the same as those of the beads made using the 10-nozzle plates.

The physical properties of the finished aluminum oxide beads are summarized in Table 1, as for the following examples.

EXAMPLE 2

The aluminum oxide hydrosol is produced and poured into the supply vessel as described in example 1. At a pressure of 0.34 bars, the sol is, as in example 1, converted into droplets with the aid of a vibrating nozzle plate with 10 nozzles of 760 $\mu$m diameter.

The applied vibration frequency is 500 Hz and the flow rate is set at 450 ml/min, with 30,000 droplets of 1.4 mm diameter being formed every minute at each nozzle. The throughput is therefore 6.0 kg of $Al_2O_3/h$. After conversion of the droplets into gel droplets using ammonia, further processing as described in example 1 now follows.

EXAMPLE 3

The aluminum oxide sol is produced and poured into the supply vessel as described in example 1. Using a 10-nozzle plate with 1.72 mm diameter nozzles, the hydrosol is converted into droplets as in example 1 at a frequency of 50 Hz and a flow rate of 460 ml/min, and made into gel beads by reaction with ammonia. The throughput is hence around 6.1 kg of $Al_2O_3/h$. To improve the bead shape of the gel particles, which have a diameter of 3.0 mm immediately after hardening, the surface tension of the aqueous ammonia solution is reduced by addition of the tenside sodium dodecyl sulphate in 0.2% concentration. By gentle blowing in of air through a glass frit into the low surface tension ammonia solution, a foam layer of about 10 mm depth is produced that regenerates continuously and has a shape-improving effect on the droplets prehardened with $NH_3$ gas.

The gel beads are collected in the ammonia solution and then processed further as described in example 1.

EXAMPLE 4

An aluminum oxide hydrosol produced as in example 1 is converted into droplets and processed to form gel beads after reaction with ammonia. The nozzles of the 10-nozzle plate have a diameter of 2.40 mm. At a frequency of 50 Hz, a flow rate of 860 ml/min is set, corresponding to a throughput of 11.4 kg of $Al_2O_3/h$. The ammonia solution is lowered in its surface tension with 0.2% by volume of sodium dodecyl sulphate. By gentle blowing in of air through a glass frit, a foam layer of 10 to 20 mm depth is produced. This layer ensures a good spherical form even of these large gel droplets of 3.8 mm diameter. After collection in the ammonia solution, the gel beads are further processed in described in example 1.

What is claimed is:

1. A process for producing substantially spherical aluminum oxide beads, comprising the steps of:

(a) passing an acidic sol based on aluminum oxide or an acidic suspension based on aluminum oxide having a viscosity of 10 to 500 mPa's through a vibrating annular nozzle plate so as to form falling hydrosol droplets, wherein the nozzle plate is vibrated at a frequency of 10 Hz to 20,000 Hz, and has at least ten droplet nozzles, (b) laterally blowing ammonia gas against the falling droplets so that the surfaces of the falling droplets are substantially evenly gelled in a substantially spherical shape, wherein the ammonia gas is carried through a narrow pipe which is laterally directed at the falling droplets and positioned a distance below the opening of said droplet nozzles;

(c) allowing the falling droplets to drop into an aqueous ammonia solution and coagulate to form substantially spherical beads;

(d) collecting the beads from the aqueous ammonia solution; and (e) converting the collected beads to aluminum oxide.

2. The process according to claim 1 wherein the converting step comprises the step of drying the aluminum oxide beads.

3. The process according to claim 2, wherein the aluminum oxide beads are dried at a temperature of 20–300° C. for 1 to 24 hours.

4. The process according to claim 2 which further comprises the step of calcining the aluminum oxide beads.

5. The process according to claim 4 wherein the aluminum oxide beads are calcined for 2–12 hours at 500 to 700° C.

6. The process according to claim 1 wherein the aluminum oxide beads are calcined for 2–12 hours at 500 to 700° C.

7. The process according to claim 1 wherein the aqueous ammonia solution contains a surface active agent for foam generation.

8. The process according to claim 1 wherein the aqueous ammonia solution contains a foam of 5 to 20 mm depth to improve bead shape.

9. The process of claim 1, wherein said droplet nozzles are arranged annularly and the ammonia gas is laterally blown against the falling droplets from the exterior of the annular arrangement of the droplet nozzles.

10. A process for producing substantially spherical aluminum oxide beads comprising:

(a) passing an acidic sol based on aluminum oxide or an acidic suspension based on aluminum oxide having a viscosity of 10 to 500 mPa's through a vibrating annular nozzle plate so as to form falling hydrosol droplets, wherein the annular nozzle plate is vibrated at a frequency of 10 Hz to 20,000 Hz and has at least ten droplet nozzles;

(b) laterally blowing ammonia gas against the falling hydrosol droplets so that surfaces of the failing hydrosol droplets are substantially evenly gelled in a substantially spherical shape wherein said droplet nozzles are arranged annularly and the ammonia gas is laterally blown against the falling droplets from the interior of the annular arrangement of the droplet nozzles, and said ammonia gas blown against said falling droplets is positioned a distance below the opening of said droplet nozzles;

(c) allowing the falling droplets to drop into an aqueous ammonia solution and coagulate to form substantially spherical beads; and (d) collecting the beads from the aqueous ammonia solution; and (e) converting the collected beads to aluminum oxide.

* * * * *